United States Patent
Ye et al.

(10) Patent No.: US 10,641,944 B2
(45) Date of Patent: May 5, 2020

(54) BUTTON INDICATOR AND LIGHT-GUIDE RING ASSEMBLY

(71) Applicant: PEGATRON CORPORATION, Taipei (TW)

(72) Inventors: Long-Sing Ye, Taipei (TW); Tao-Hsiang Tang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/421,214

(22) Filed: May 23, 2019

(65) Prior Publication Data

US 2019/0377124 A1 Dec. 12, 2019

(30) Foreign Application Priority Data

Jun. 12, 2018 (TW) .............................. 107120178 A

(51) Int. Cl.
*F21V 8/00* (2006.01)
(52) U.S. Cl.
CPC ......... *G02B 6/0045* (2013.01); *G02B 6/0068* (2013.01)
(58) Field of Classification Search
CPC .......................... G02B 6/0045; G02B 6/0068
See application file for complete search history.

(56) References Cited

U.S. PATENT DOCUMENTS

| 7,193,170 | B2 | 3/2007 | Katayama et al. | |
|---|---|---|---|---|
| 2010/0314229 | A1* | 12/2010 | Ominato | D05B 69/04 200/314 |

FOREIGN PATENT DOCUMENTS

| CN | 102637546 | 7/2014 |
|---|---|---|
| CN | 206340465 | 7/2017 |

\* cited by examiner

*Primary Examiner* — Thomas M Sember
(74) *Attorney, Agent, or Firm* — J.C. Patents

(57) ABSTRACT

A button indicator and a light guiding ring assembly are provided. The button indicator includes a button cover and a light guiding ring. The button cover has a cover body, retaining walls and hooks. The cover body has a top surface and a bottom surface. The retaining walls and the hooks protruded from the bottom surface are disposed around the cover body. The light guiding ring sleeved on the button cover has a ring body, elastic arms, a sliding matching groove and light guiding portions. The ring body has an inner surface with the elastic arms and the sliding matching groove disposing thereon and an outer surface with the light guiding portions locating thereon. The retaining walls abut against the inner surface of the ring body, and the hooks move along and snap the sliding matching groove. The elastic arms abut against the bottom surface of the cover body.

11 Claims, 5 Drawing Sheets

BUTTON INDICATOR AND LIGHT-GUIDE RING ASSEMBLY

CROSS-REFERENCE TO RELATED APPLICATION

This application claims the priority benefit of Taiwan application serial no. 107120178, filed on Jun. 12, 2018. The entirety of the above-mentioned patent application is hereby incorporated by reference herein and made a part of this specification.

BACKGROUND

Technical Field

The present disclosure relates to an indicator and a light guiding ring assembly, and more particularly to a button indicator and a light guiding ring assembly applied thereto.

Description of Related Art

Electronic products, such as power supplies, game consoles, computers, etc., are often provided with indicators to indicate whether the electronic products are operating. Taking the indicator of the power supply as an example, the indicator is usually in the shape of a dot, and is generally configured to have a through hole on the housing of the power supply, while the lens are spliced at the through hole with a light source is disposed in the housing corresponding to the lens. The light of the light source penetrates the lens to display the operation state of the power supply.

SUMMARY

The present disclosure provides a button indicator having ease of assembly.

The present disclosure provides a light guiding ring assembly that improves luminous efficiency.

The disclosure provides a button indicator comprising a button cover and a light guiding ring. The button cover has a cover body, multiple retaining walls and multiple hooks. The cover body has a top surface and a bottom surface, wherein the top surface and the bottom surface are oppositely disposed, the retaining walls and the hooks protruded from the bottom surface are disposed around the cover body. The light guiding ring is sleeved on the button cover, wherein the light guiding ring has a ring body, multiple elastic arms, a sliding matching groove and multiple light guiding portions. The ring body has an inner surface and an outer surface, the elastic arms and the sliding matching groove are disposed on the inner surface, and the light guiding portion are located on the outer surface. The retaining walls are adapted to abut against the inner surface of the ring body, and the hooks are adapted to move along the sliding matching groove and to snap the sliding matching groove. The elastic arms are adapted to abut against the bottom surface of the cover body.

In an embodiment of the disclosure, the elastic arms are protruded from the inner surface of the ring body towards the center of the ring body and extend along an axial direction of the button cover towards the ring body.

In an embodiment of the disclosure, the light guiding portions are grooves, and an arc angle of each of the grooves ranges from 91 degrees to 101 degrees.

In an embodiment of the disclosure, the outer surface of the ring body is an inclined surface, and an angle between the inclined surface and an horizontal plane ranges from 111 degrees to 117 degrees.

In an embodiment of the disclosure, the number of the elastic arms is greater than or equal to 3.

In an embodiment of the disclosure, the button indicator further includes a plurality of light sources surrounding the light guiding ring, and the light sources are configured corresponding to the light guiding portions.

In an embodiment of the disclosure, the button indicator further includes a hood disposed around the outer surface of the ring body of the light guiding ring and exposing the light guiding portions.

In an embodiment of the disclosure, the button indicator further includes a button guide sleeve, and the button cover further includes a support shaft, the support shaft is located inside of the retaining walls and the hooks, and the button guide sleeve is assembled with the support shaft to fix the button cover and the light guiding ring together.

The disclosure provides a light guiding ring assembly comprising a light guiding ring and a hood. The light guiding ring has a ring body and multiple light guiding portions. The ring body has an outer surface, and the light guiding portions are located on the outer surface, wherein the light guiding portions are grooves. The hood is disposed around the outer surface of the ring body and exposes the light guiding portions.

In an embodiment of the disclosure, an arc angle of each of the grooves ranges from 91 degrees to 101 degrees.

In an embodiment of the disclosure, the outer surface of the ring body is an inclined surface, and an angle between the inclined surface and a horizontal plane ranges from 111 degrees to 117 degrees.

Based on the above, the light guiding ring assembly of the present disclosure and the button indicator using the light guiding ring assembly can be easily assembled through sleeve, rotation and buckle by the structural design of the button cover and the light guiding ring, and then the button guide sleeve is assembled to the support shaft of the button cover to fix the button cover and the light guiding ring together. In addition, the hood covering the outer surface of the ring body of the light guiding ring can prevent the light guiding ring from leaking light, thereby improving light efficiency.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
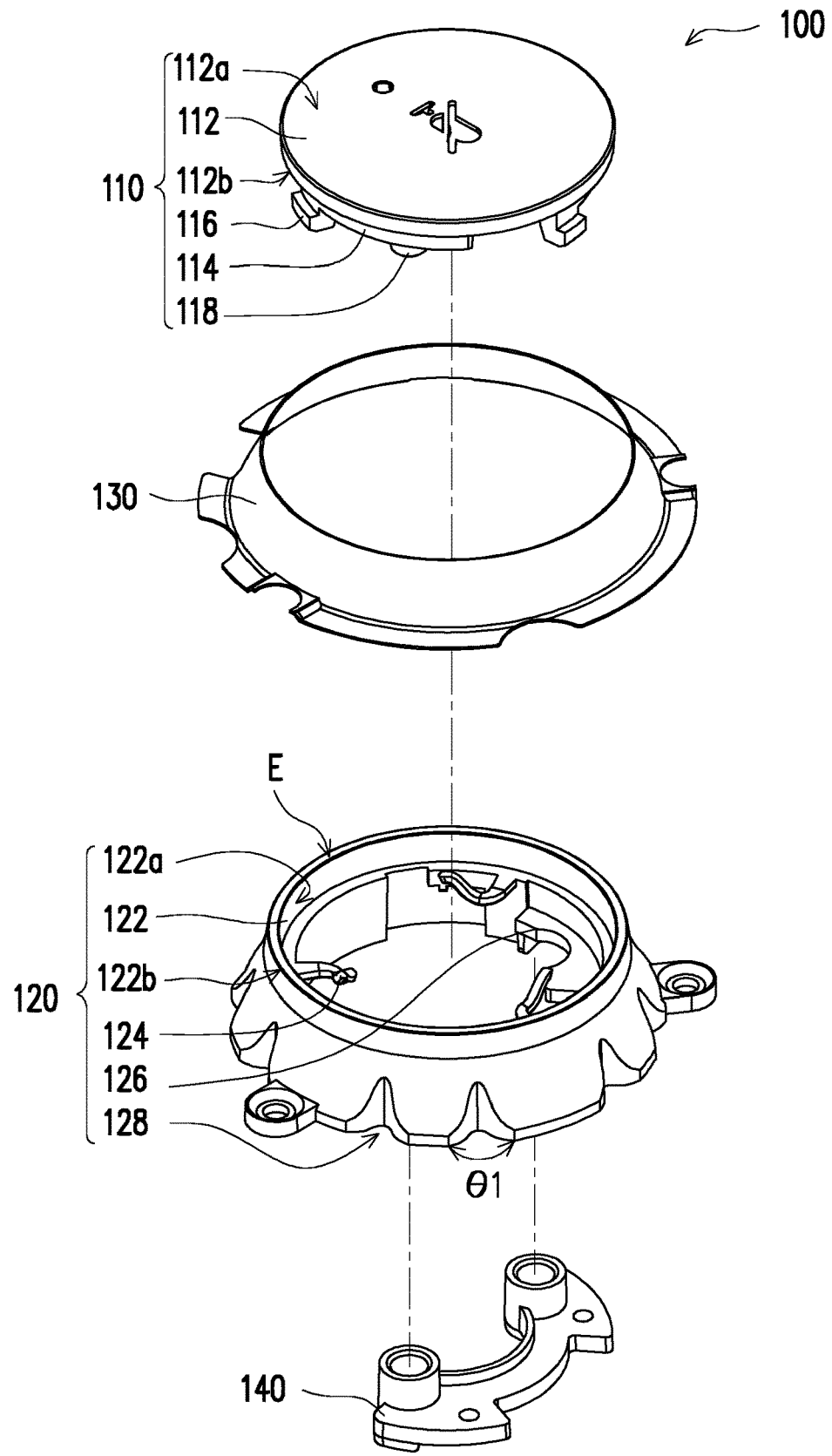
FIG. 1A is an exploded perspective view of a button indicator according to an embodiment of the present invention.
Figure 1B:
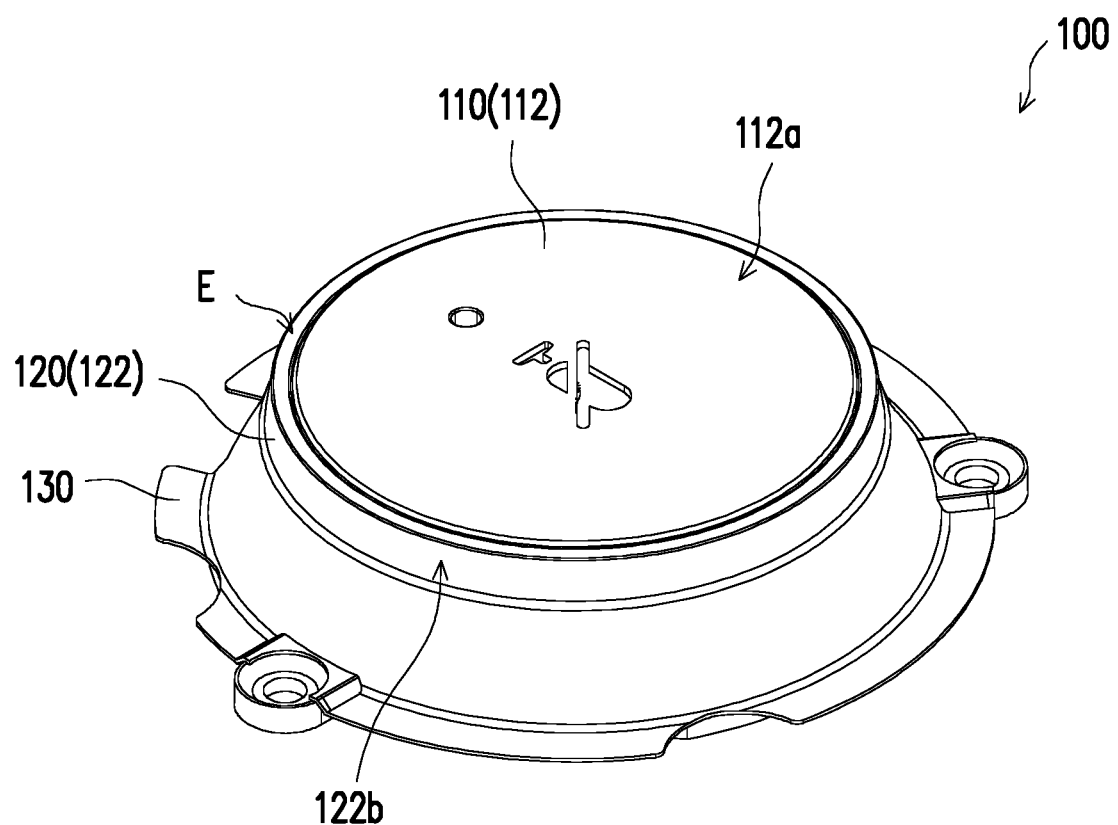
FIG. 1B is a schematic diagram of the combination of the button indicators of FIG. 1A.
Figure 1C:
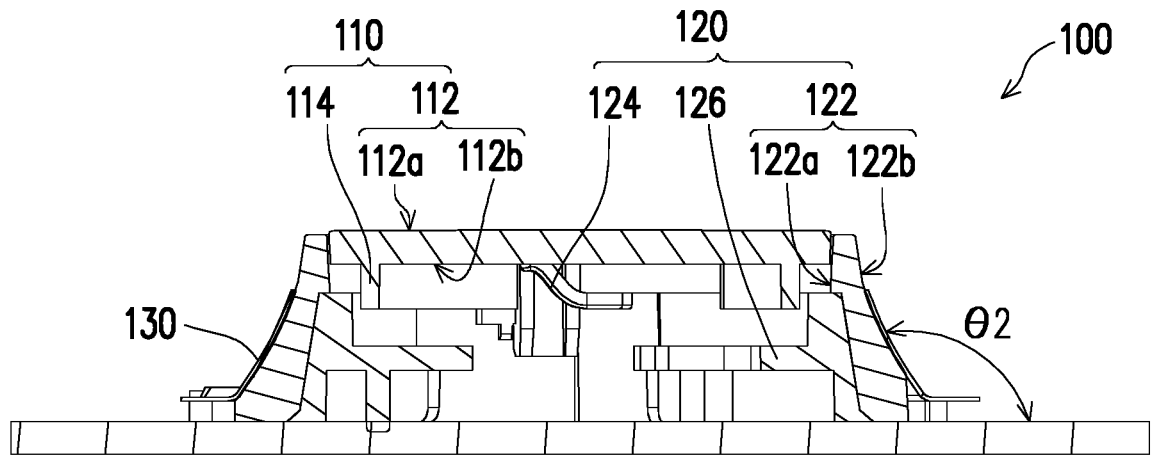
FIG. 1C is a cross-sectional view of the button indicator of FIG. 1B.

FIG. 1A is an exploded perspective view of a button indicator according to an embodiment of the present invention, FIG. 1B is a schematic diagram of the combination of the button indicators of FIG. 1A, and FIG. 1C is a cross-sectional view of the button indicator of FIG. 1B. Referring to FIG. 1A, FIG. 1B and FIG. 1C, the button indicator 100 includes a button cover 110 and a light guiding ring 120. The button indicator 100 further includes a hood 130 and a button guide sleeve 140. The button cover 110 is assembled with the light guiding ring 120, the hood 130 is covered outside the light guiding ring 120, and the button guide sleeve 140 is assembled to a lower portion of the button cover 110, so as to fix the button cover 110 and the light guiding ring 120 together.

Figure 2:
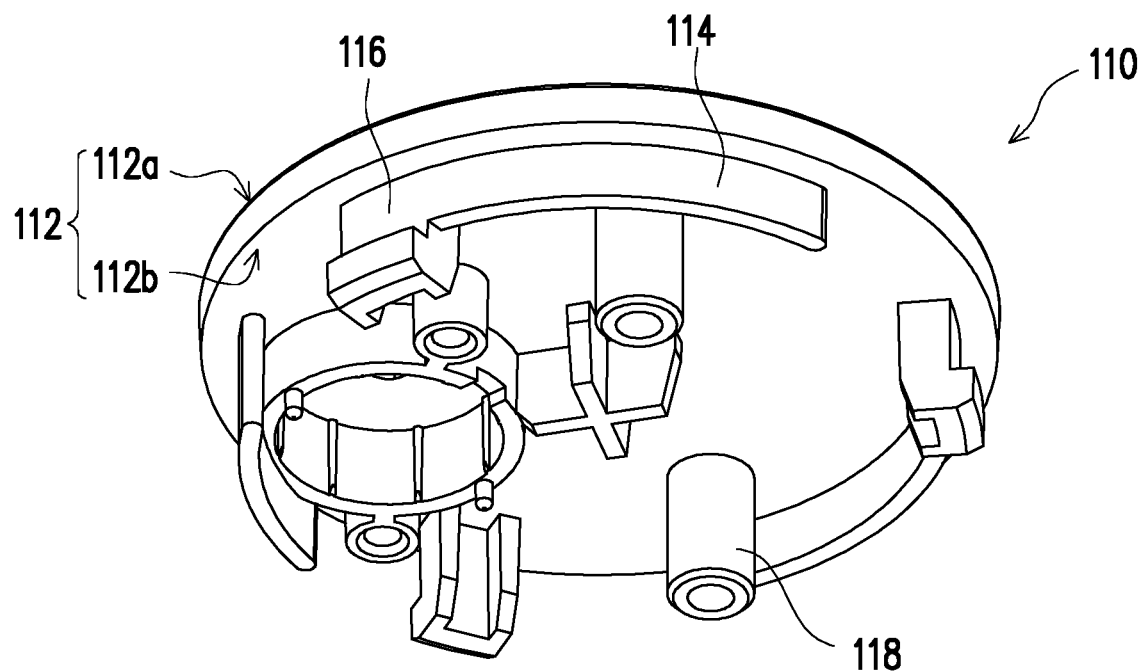
FIG. 2 is a schematic view of the button cover of the button indicator of FIG. 1A.

FIG. 2 is a schematic view of the button cover of the button indicator of FIG. 1A. Referring to FIG. 1A and FIG. 2 simultaneously, the button cover 110 has a cover body 112, multiple retaining walls 114 and multiple hooks 116. The cover body 112 has opposite top and bottom surfaces 112a, 112b, wherein the retaining walls 114 and the hooks 116 protrude from the bottom surface 112b. As shown in FIG. 2, the retaining walls 114 are spaced apart along a circumference edge of the cover body 112 at the bottom surface 112b, and the hooks 116 are disposed between the retaining walls 114 along the edges of the cover body 112.

Incidentally, in the present embodiment, one of the hooks 116 is formed integrally with a corresponding one of the retaining walls 114, that is, the hooks 116 extend from one side of the retaining walls 114; in other embodiments, the hooks 116 and the retaining walls 114 are provided separately.

The button cover 110 also has a support shaft 118. The support shaft 118 protrudes from the bottom surface 112b and is located inside the cover body 112, that is, the support shaft 118 is located within a range surrounded by the retaining walls 114 and the hooks 116.

Figure 3:
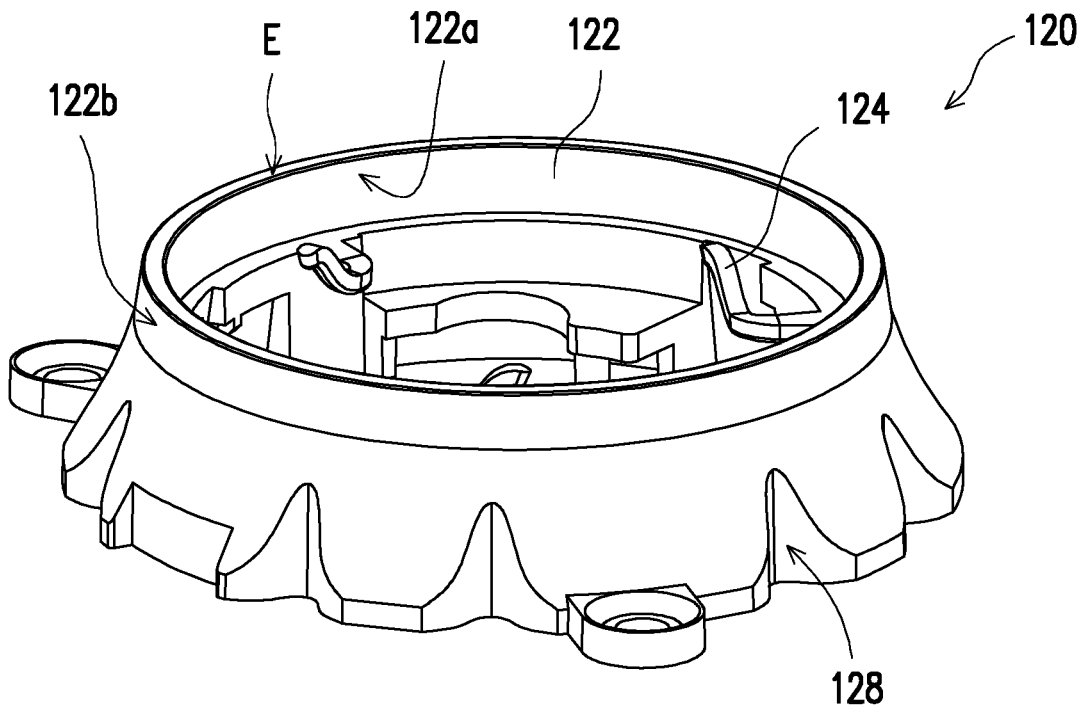
FIG. 3 is a schematic view of a light guiding ring of the button indicator of FIG. 1A.
Figure 4:
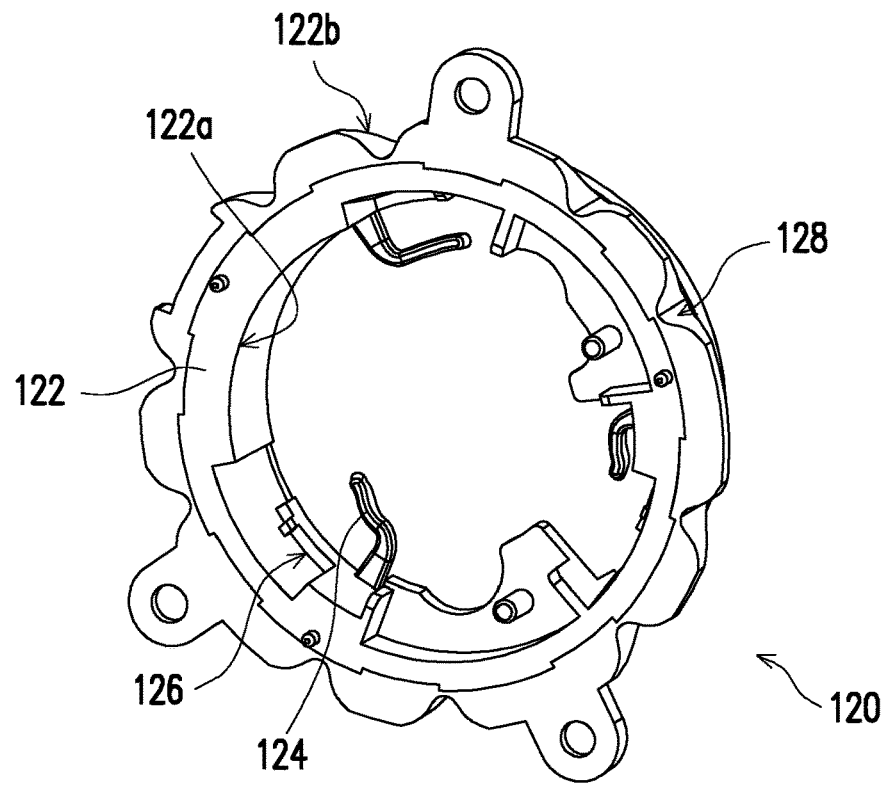
FIG. 4 is a schematic view of another perspective of the light guiding ring of FIG. 3.

FIG. 3 is a schematic view of a light guiding ring of the button indicator of FIG. 1A. FIG. 4 is a schematic view of another perspective of the light guiding ring of FIG. 3. Referring to FIG. 1A, FIG. 3 and FIG. 4, the light guiding ring 120 has a ring body 122, multiple elastic arms 124, a sliding matching groove 126 and a light guiding portion 128. The ring body 122 has an inner surface 122a and an outer surface 122b. The elastic arms 124 and the sliding matching groove 126 are disposed on the inner surface 122a, and the light guiding portions 128 are located on the outer surface 122b.

In detail, the outer surface 122b of the ring body 122 is an inclined surface that is inclined downward and outward from the upper side of the ring body 122 (as shown in FIG. 1C), wherein an angle θ2 between the inclined surface and a horizontal plane ranges from 111 degrees to 117 degrees. Further, the light guiding portions 128 are grooves formed on the outer surface 122b, and arc angles θ1 of the grooves range from 91 degrees to 101 degrees.

The elastic arms 124 protrude from the inner surface 122a of the ring body 122 toward the center of the ring body 122, and the elastic arms 124 further extend along an axial direction of the ring body 122 toward the button cover 110. In other words, the elastic arms 124 extend both radially and axially. In the present embodiment, the number of the elastic arms 124 is, for example, three, and the elastic arms 124 are interval arranged. In other embodiments, the number of elastic arms 124 can be varied as desired, such as by setting more than three elastic arms 124.

In addition, the sliding matching groove 126 protrudes from the inner surface 122a of the ring body 122 toward the center of the ring body 122, and is used for guiding the hooks 116 to the positioning and snaps with the hooks 116 when the button cover 110 is assembled to the light guiding ring 120.

The hood 130 is disposed around the outer surface 122b of the ring body 122 of the light guiding ring 120, and exposes the light guiding portion 128, wherein the hood 130 is a white hood. The hood 130 is disposed to avoid leakage of light, which can increase the light intensity of the light-emitting surface E.

The button guide sleeve 140 is used to be assembled with the support shaft 118 of the button cover 110 to fix the button cover 110 and the light guiding ring 120 together.

The steps of assembling the button cover 110, the light guiding ring 120, the hood 130 and the button guide sleeve 140 to form the button indicator 100 will be described in detail later.

Referring to FIG. 1A, FIG. 2 and FIG. 4, the step of arranging the light guiding ring 120 and the button cover 110 to each other includes inserting the button cover 110 into the light guiding ring 120, wherein the retaining walls 114 of the button cover 110 abuts the inner surface 122a of the ring body 122, and the user rotates the button cover 110 to move the hooks 116 of the button cover 110 along the sliding matching groove 126 disposed on the inner surface 122a of the ring body 122 of the light guiding ring 120, and with the rotation of the button cover 110, the hooks 116 are moved to a predetermined position and snaps to the sliding matching groove 126 to initially assemble the light guiding ring 120 and the button cover 110 together.

Figure 5:
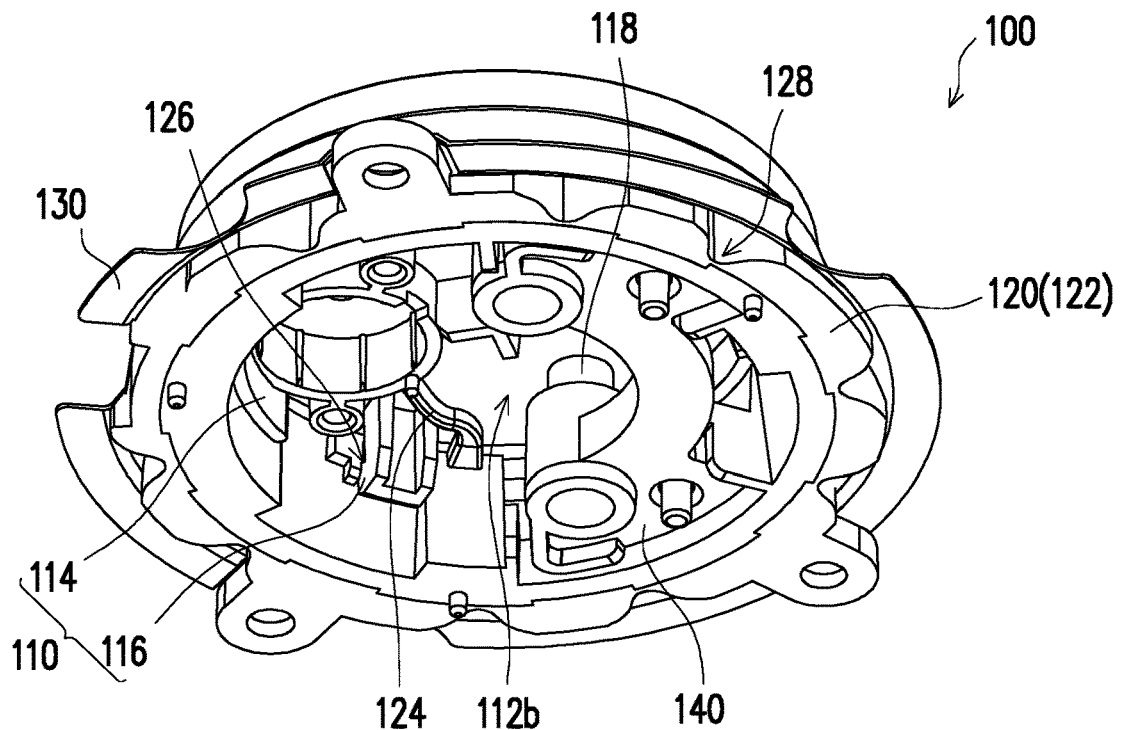
FIG. 5 is a schematic view of another perspective of the button indicator of FIG. 1B.

FIG. 5 is a schematic view of another perspective of the button indicator of FIG. 1B. Referring to FIG. 1A and FIG. 5 simultaneously, the button guide sleeve 140 is then assembled to the support shaft 118 of the button cover 110 in a socket manner. In addition, hot melt can be utilized to secure the button guide sleeve 140 with the support shaft 118.

Thereafter, the hood 130 is covered outside the light guiding ring 120.

Figure 6:
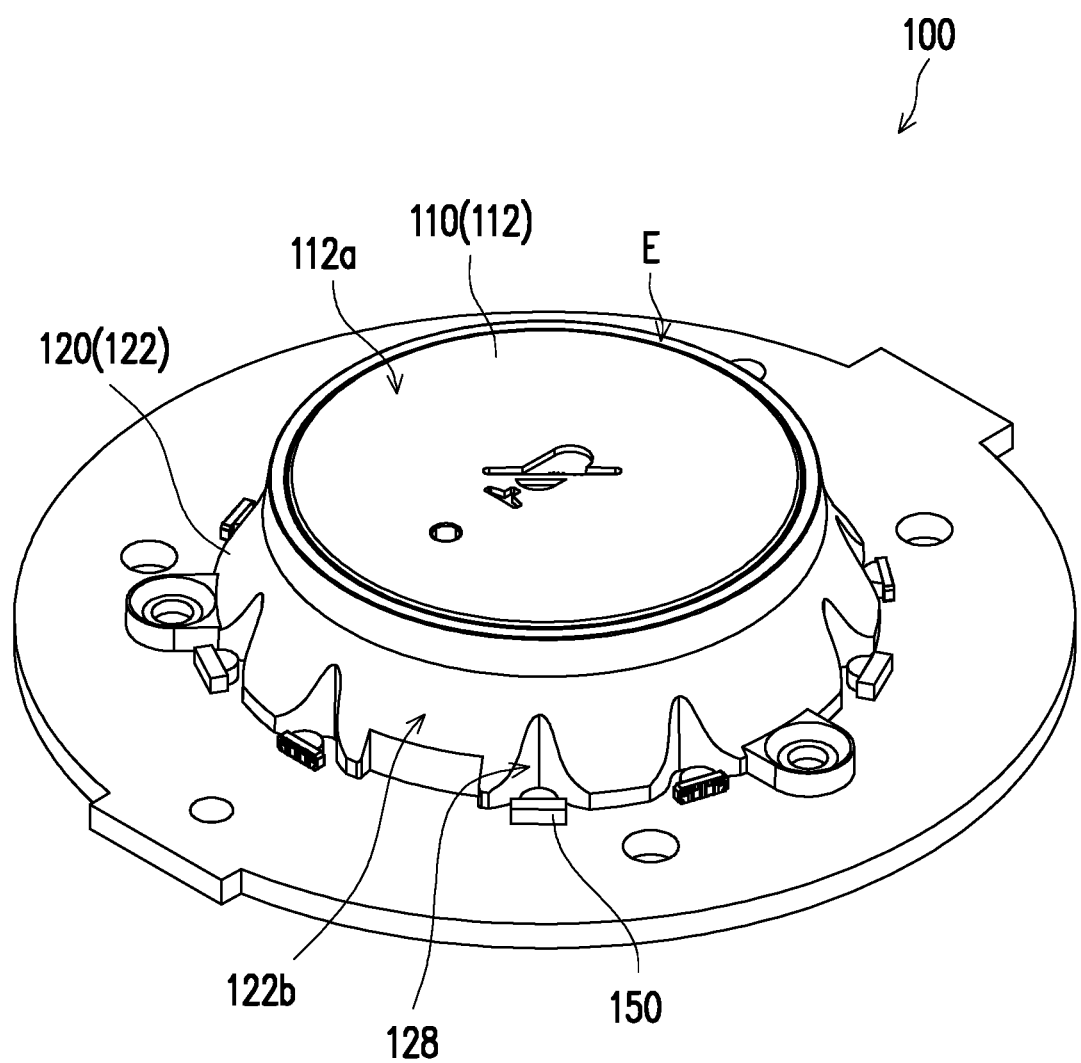
FIG. 6 is a schematic diagram illustrating a light source surrounding a light guiding ring and configured corresponding to the light guiding portions.

FIG. 6 is a schematic diagram illustrating a light source surrounding a light guiding ring and configured corresponding to the light guiding portions. Referring to FIG. 6, for convenience of explanation, the hood 130 is omitted in FIG. 6. The button indicator 100 further includes a plurality of light sources 150 disposed around the light guiding ring 120 and configured corresponding to the light guiding portions 128. The light sources 150 are pairs of light emitting diodes, wherein the light emitting diodes may include a white light emitting diode and a color light emitting diode.

For example, the number of the light emitting diodes may be set as 8 or 10, and the number of the light guiding portions 128 disposed the outer surface 122b of the ring body 122 of the light guiding ring 120 correspondingly are also set as 8 or 10. That is to say, one of the light emitting diodes is disposed corresponding to one of the light guiding portions 128. The light guiding portions 128 are disposed at a fixed angular interval to achieve uniform illumination.

Referring to FIG. 1C and FIG. 6 simultaneously, when the button indicator 100 is pressed, the user presses the button cover 110 to move the button cover 110 downward relative to the light guiding ring 120 along the pressing direction and trigger the switch to cause the light source 150 to emit light. While the button cover 110 is moved downward relative to the light guiding ring 120 along the pressing direction, the button cover 110 relies on the retaining walls 114 and the inner surface 122a of the ring body 122 of the light guiding ring 120 for smooth movement to avoid sway. At the same time, the interaction of the button guide sleeve 140 with the support shaft 118 also facilitates the smooth movement of the button cover 110 relative to the light guiding ring 120.

At the same time, the elastic arms 124 extending from the inner surface 122a of the ring body 122 and abutting against the bottom surface 112b of the top cover body 112 is deformed by the movement of the button cover 110, and stores an elastic restoring force.

The elastic restoring force stored in the elastic arms 124 pushes the button cover 110 upward to return to the original position, when the user stops applying the force to press the button cover 110.

Incidentally, the foregoing mentioned three elastic arms 124 provided with such a configuration are used to distribute the pressure more uniformly.

Light emitted from the light source 150 enters the light guiding ring 120 through the light guiding portions 128, wherein the light guiding ring 120 has a secondary additive therein, such as white powder. The light entering the light guiding ring 120 collides with the white powder inside the light guiding ring 120 is then refracted or reflected in the designed light guiding path inside the light guiding ring 120, and therefore uniform light is emitted from the light emitting surface E of the light guiding ring 120. Therefore, the user can see a uniform and distinct indicator.

In summary, the button indicator of the present invention has at least the following advantages:
1. The button cover and the light guiding ring are assembled through simply method such as sleeve, rotation and snap through the structural design of the button cover and the light guiding ring.
2. The elastic arms are disposed on the inner surface of the light guiding ring to improve space utilization.
3. The elastic arms extend along the radial direction and the axial direction at the same time to provide a better supporting touch feeling, so that the button cover can give the user a loosened touch feeling when the button is pressed.
4. The button cover is initially fixed with the light guiding ring after being locked in, and thus the hooks of the button cover can be designed as a shorter hook-arm, thereby improving the stability of the hooks when the button cover and the light guiding ring are assembled.
5. The button cover has a support shaft and is matched with the button guide sleeve to prevent the button cover from shaking when being pressed.
6. The light guiding portions disposed on the outer surface of the light guiding ring can enhance the efficiency of light emitted from the light source entering the light guiding ring. In addition, generally, in the case of using eight light-emitting diodes, the requirement for the uniformity is about 50%; and in the present invention, the secondary additive is added into the light guiding ring for increasing the uniformity of the light emitted from the light-emitting surface over 70%. Therefore, the number of the light sources can be reduced, or the brightness requirement for the light source can be reduced, thereby saving costs.
7. The hood covering the outer surface of the ring body of the light guiding ring can avoid light leakage of the light guiding ring, thereby improving light efficiency and reducing the number of light sources to save cost.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A button indicator, comprising:
   a button cover, having a cover body, a plurality of retaining walls and a plurality of hooks, the cover body having a top surface and a bottom surface, wherein the top surface and the bottom surface are oppositely disposed, the retaining walls and the hooks are protruded from the bottom surface, and the retaining walls and the hooks are disposed around the cover body; and
   a light guiding ring, assembled with the button cover, having a ring body, a plurality of elastic arms, a sliding matching groove and a plurality of light guiding portions, wherein the ring body has an inner surface and an outer surface, the elastic arms and the sliding matching groove are disposed on the inner surface, the light guiding portions are located on the outer surface, the retaining walls are adapted to abut the inner surface of the ring body, and the hooks are adapted to move along and to be hooked to the sliding matching groove, and the elastic arms are adapted to abut the bottom surface of the cover body.

2. The button indicator of claim 1, wherein the elastic arms are protruded from the inner surface of the ring body toward a center of the ring body, and extend along an axial direction of the ring body toward the button cover.

3. The button indicator according to claim 1, wherein the light guiding portions are grooves, and an arc angle of the groove ranges from 91 degrees to 101 degrees.

4. The button indicator according to claim 1, wherein the outer surface of the ring body is an inclined surface, and an angle between the inclined surface and a horizontal plane ranges from 111 degrees to 117 degrees.

5. The button indicator of claim 1, wherein the number of the elastic arms is greater than or equal to 3.

6. The button indicator according to claim 1, further comprising a plurality of light sources, surrounding the light guiding ring and configured corresponding to the light guiding portions.

7. The button indicator of claim 1, further comprising a hood, disposed around the outer surface of the ring body of the light guiding ring and exposing the light guiding portions.

8. The button indicator according to claim 1, further comprising a button guide sleeve, the button cover further comprising a support shaft, the support shaft is located inside of the retaining walls and the hooks, wherein the button guide sleeve is assembled with the support shaft to fix the button cover and the light guiding ring together.

9. A light guiding ring assembly, assembled with the button cover having a cover body, a plurality of retaining walls and a plurality of hooks, the cover body having a top surface and a bottom surface, the top surface and the bottom surface being oppositely disposed, the retaining walls and the hooks being protruded from the bottom surface, the retaining walls and the hooks being disposed around the cover body, and the light guiding ring assembly comprising:
- a light guiding ring, having a ring body, a plurality of elastic arms, a sliding matching groove, and a plurality of light guiding portions, the ring body having an inner surface and an outer surface, the elastic arms and the sliding matching groove being disposed on the inner surface, the light guiding portions being located on the outer surface, wherein the light guiding portions are grooves, the retaining walls are adapted to abut the inner surface of the ring body, and the hooks are adapted to move along and to be hooked to the sliding matching groove, and the elastic arms are adapted to abut the bottom surface of the cover body; and
- a hood, disposed around the outer surface of the ring body, and exposing the light guiding portions.

10. The light guiding ring assembly of claim 9, wherein the arc angle of the groove ranges from 91 degrees to 101 degrees.

11. The light guiding ring assembly of claim 9, wherein the outer surface of the ring body is an inclined surface, and an angle between the inclined surface and a horizontal plane ranges from 111 degrees to 117 degrees.

\* \* \* \* \*